US006172339B1

(12) United States Patent
Thevenin

(10) Patent No.: US 6,172,339 B1
(45) Date of Patent: Jan. 9, 2001

(54) ELECTRICAL COOKING APPLIANCE WITH REMOVABLE BOWL

(75) Inventor: Jean-Marie Thevenin, Bourberain (FR)

(73) Assignee: SEB S.A., Ecully (FR)

( * ) Notice: Under 35 U.S.C. 154(b), the term of this patent shall be extended for 0 days.

(21) Appl. No.: 09/367,008

(22) PCT Filed: Dec. 8, 1998

(86) PCT No.: PCT/FR98/02661

§ 371 Date: Sep. 3, 1999

§ 102(e) Date: Sep. 3, 1999

(87) PCT Pub. No.: WO99/29219

PCT Pub. Date: Jun. 17, 1999

(30) Foreign Application Priority Data

Dec. 9, 1997 (FR) .................................................. 97 15821

(51) Int. Cl.[7] .............................. A47J 37/12; A47J 27/62; H01H 37/32; H05B 1/02
(52) U.S. Cl. .......................... 219/429; 219/432; 219/435; 99/329 R
(58) Field of Search ..................................... 219/429, 432, 219/433, 435, 441; 99/326, 329 R, 337

(56) References Cited

U.S. PATENT DOCUMENTS

| 4,164,644 | * | 8/1979 | Remsnyder et al. | 219/433 |
| 4,307,287 | * | 12/1981 | Weiss | 219/432 |
| 5,740,721 | | 4/1998 | Bizard et al. | |
| 5,809,870 | * | 9/1998 | Baillieul | 99/331 |

FOREIGN PATENT DOCUMENTS

| 3143450 | * | 5/1983 | (DE) . |
| 3430878 | * | 3/1986 | (DE) . |
| 297 09 294 U | | 9/1997 | (DE) . |
| 133906 | * | 3/1985 | (EP) . |
| 2222025 | * | 2/1990 | (GB) . |
| 2 306 878 | | 5/1997 | (GB) . |
| FR95/01103 | | 2/1996 | (WO) . |

* cited by examiner

Primary Examiner—Joseph Pelham
(74) Attorney, Agent, or Firm—Browdy and Neimark

(57) ABSTRACT

An electric cooking appliance having a housing receiving a removable bowl, a heating element in thermal contact with the bowl when the bowl is seated in the housing, a heat adjuster, an ultimate safety switch to act in case of failure of the heat adjuster, and a thermal limit switch mounted in the housing. The thermal limit switch is set to be triggered before the ultimate safety switch if the bowl in not seated in the housing.

14 Claims, 1 Drawing Sheet

ELECTRICAL COOKING APPLIANCE WITH REMOVABLE BOWL

This application is a national phase of international application PCT/FR98/02661 filed Dec. 8, 1998 which designated the U.S.

TECHNICAL FIELD

The present invention relates to the general technical field of electric cooking appliances comprising a removable cooking bowl and concerns more particularly the thermal protection means.

The invention concerns cooking appliances with a removable bowl, the heating power of which permits foodstuffs disposed in the bowl to be brought to temperatures greater than or equal to 140° C. The invention concerns in particular fryers.

In appliances of the above-cited type a control of the operation of the heating means in the absence of the removable bowl is necessary, because of the high power of the heating means.

PRIOR ART

Patent application WO 96/05761 describes an electric heating appliance for foods, in particular for performing frying, comprising a removable bowl, said appliance being furnished with a safety body provided to prevent heating in the absence of the bowl, as well as in situations where the bowl correctly installed in the body of the appliance contains an insufficient quantity of fat, or even no fat at all. This device has the drawback of comprising a large number of mechanical parts and necessitating a very precise assembly, there are also numerous gaps favorable for dirt and infiltrations of fat or of steam. This device is thus costly and unreliable.

It is known moreover to provide an electric fryer with a removable bowl comprising a device for detecting the presence of the bowl provided to prevent heating in the absence of the bowl, formed by a switch whose button is actuated by the bowl correctly positioned in the appliance, as well as a safety limit switch mounted on a counter-bowl behind a sheet provided to come in contact with the bowl when this latter is disposed in the appliance body. The safety limit switch is provided to open the electric circuit before the fuse is activated as a result of heating of the appliance, when the bowl contains no fat or a quantity very much less than the expected quantity. Because of the high power of the heating means, the body of the appliance and the cover made of plastic material are susceptible to be damaged if the appliance is placed in operation in the absence of the bowl. The above-cited device for detection of the presence of a bowl permits these drawbacks to be avoided. This device presents however the drawback of comprising several movable mechanical elements, accessible to the user and capable of being displaced and/or deteriorated by the latter during cleaning.

SUMMARY OF THE INVENTION

The object of the invention aims in consequence to provide a remedy to the different drawbacks enumerated previously and to furnish an electric cooking appliance with a removable bowl comprising a particularly simple and tested thermal protection means.

The objects assigned to the invention are achieved with the aid of an electric cooking appliance, comprising a body forming a housing provided to receive a removable bowl, heating means in thermal communication with the bowl when the latter is disposed in the housing, heat adjusting means, ultimate safety means provided to compensate for failure of the heat adjusting means, comprising a thermal limit switch mounted on a support disposed in the body, said limit switch being susceptible to being triggered before the ultimate safety means when the bowl is not disposed in the housing.

This construction permits detection by the limit switch of an abnormal heating intervening in the housing in the absence of a bowl. This construction offers the advantage of avoiding heating or damaging of the appliance without utilizing a mechanical detector of the presence of the bowl formed by safety elements comprising a movable part with respect to the body of the appliance.

Advantageously, the body comprises a counter-bowl forming the support on which the limit switch is mounted, the interior face of the counter-bowl delimiting the housing.

This construction permits particularly to avoid degradation of the body when this latter is made of a plastic material having a limited temperature resistance.

Advantageously the limit switch is manually resettable.

This arrangement permits the user to become aware of a non-conforming utilization of the appliance or of a defect in the adjusting means. Placing the appliance back into operation requires a voluntary action, either by the user when the appliance comprises a resetting organ accessible to the user, or by the repair service in the contrary case.

BRIEF DESCRIPTION OF THE DRAWINGS

Other advantages and particularities of the invention will appear more clearly with the aid of the description made herebelow, with reference to the attached drawing which shows by way of nonlimiting example an embodiment of the object of the invention in which.

BEST MANNER OF CARRYING OUT THE INVENTION

Figure 1:
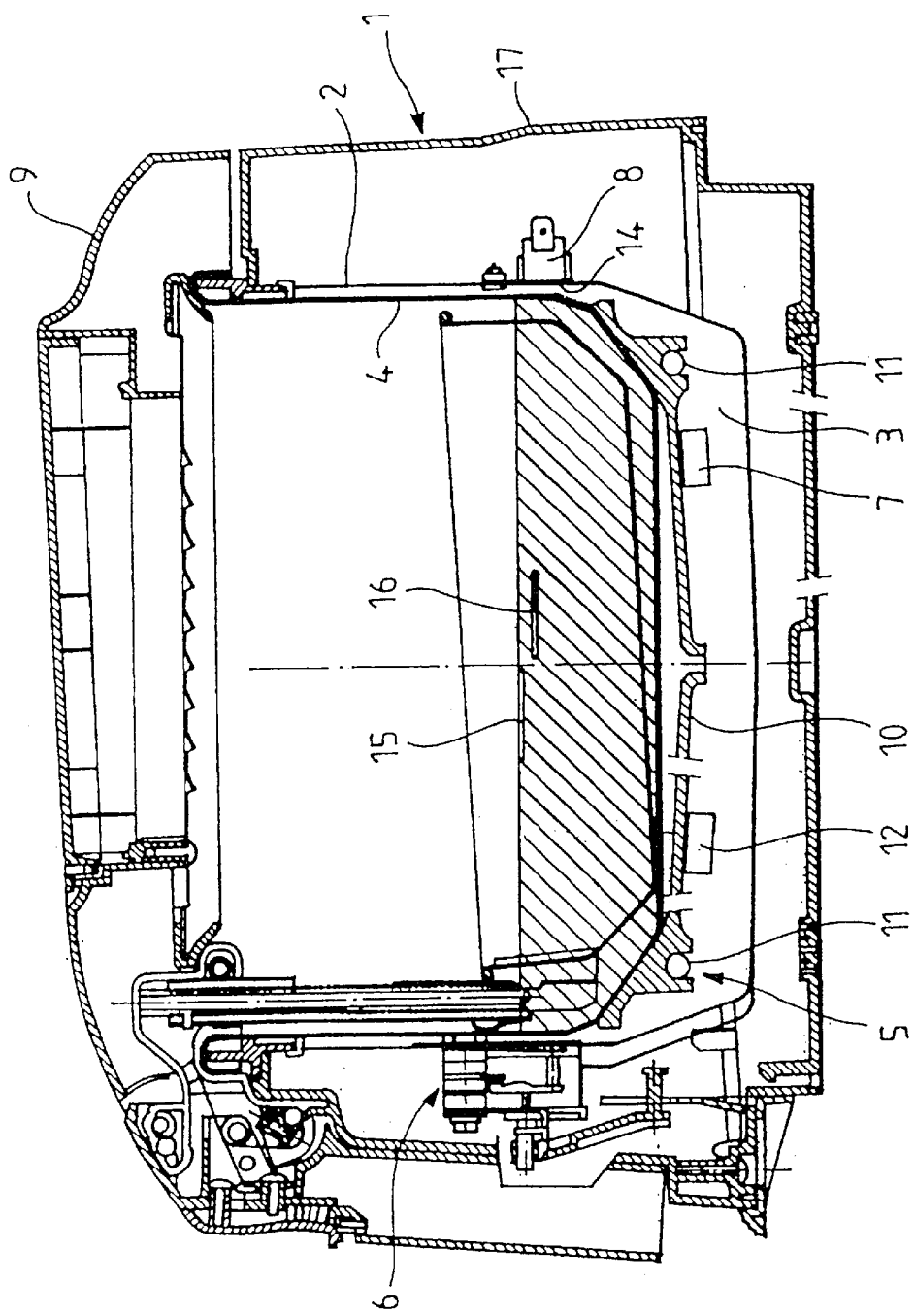
FIG. 1 shows in a cross-sectional view an electric cooking appliance according to the invention.

The electric cooking appliance shown in FIG. 1 is an electric fryer comprising in a known manner a body 1 forming a housing 3 provided to receive a removable bowl 4, heating means 5 in thermal communication with bowl 4 when this latter is disposed in housing 3, heat adjusting means 6, ultimate safety means 7 provided to compensate failure of heat adjusting means 6. Advantageously, body 1 is capable of being closed by a cover 9.

According to the invention, the fryer comprises a thermal limit switch 8 mounted on a support 14 in body 1. Limit switch 8 is capable of being actuated before ultimate safety means 7 when bowl 4 is not disposed in housing 3. Thermal limit switch 8 is provided to detect the temperature of the environment, and is not capable of entering into mechanical contact with bowl 4 disposed in housing 3. This thermal limit switch is a reliable and tested component, the mounting of which on support 14 is simple.

Advantageously, as shown in FIG. 1, body 1 comprises a counter-bowl 2 forming support 14, and an exterior envelope 17 made of an inexpensive plastic material, having a limited temperature resistance, such as for example polypropylene. The interior face of counter-bowl 2 delimits housing 3.

According to a preferred version of the invention shown in FIG. 1, limit switch 8 is mounted on the exterior face of counter-bowl 2, at the side of envelope 17.

Advantageously, limit switch 8 is resettable manually.

In an advantageous manner, bowl 4 placed in housing 3 is interposed between heating means 5 and support 14 on which is mounted limit switch 8.

This arrangement permits limiting the heating of support 14 and of limit switch 8 when bowl 4 is present in housing 3, all the more when said bowl contains a sufficient quantity of fat, said bowl forming a thermal screen, and inversely of rapidly triggering limit switch 8 in case of the absence of bowl 4 in housing 3, or when bowl 4 is present but insufficiently filled with fat, or even when bowl 4 does not contain fat at all, as a result of the greater heating of bowl 4.

According to an advantageous version of the invention, bowl 4 presents at least one oil level mark 15, 16. Bowl 4 shown in FIG. 1 has a maximum oil level mark 15 and a minimum oil level mark 16. Limit switch 8 is mounted substantially opposite at least one of level marks 15, 16 of bowl 4 disposed in housing 2, and advantageously opposite minimum oil level 16 and below maximum oil level 15 of bowl 4 disposed at housing 2.

In one of the possible forms of construction, shown in figure 1, the fryer comprises heating means 5 forming a metal heating block 10 in which is embedded at least one sheathed heating element 11 associated with suitable adjustment means 12 provided to limit the temperature of said heating block, said heating block being mounted on counter-bowl 2, in the bottom of housing 3, and being provided to support bowl 4.

The appliance according to the invention operates in the following manner:

In the case of normal operation in which the fryer placed in operation comprises bowl 4 correctly disposed in housing 3 and filled with the recommended quantity of fat, heat adjusting means 6 intervene before thermal switch 8 is activated.

In the case of operation without a bowl, the temperature of support 14 on which limit switch 8 is placed increases more rapidly than during normal operation, even if the heat adjusting means 6 intervene. Limit switch 8 reacts to this abnormal heating and limits the increase in ambient temperature, before the ultimate safety means 7 are activated. The limitation of heating obtained due to the action of limit switch 8 avoid excessive heating of body 1, and this is particularly advantageous when body 1 is in made of a plastic material, above all when body 1 is made of a low quality plastic material. This limitation of temperature is applied equally to other parts of the product. The heating limitation is equally advantageous in the case where body 1 is made of metal, lacquered or not.

According to an advantageous version of the invention, limit switch 8 is capable of being triggered before ultimate safety means 7 when bowl 4 does not contain fat. In effect, bowl 4 is heated more rapidly than in the case of normal operation and the wall of bowl 4 opposite support 14 heats this latter, which permits triggering limit switch 8.

According to an advantageous version of the invention, limit switch 8 is capable of being triggered before ultimate safety means 7 when bowl 4 contains an insufficient quantity of fat. By insufficient quantity of fat, there is meant a quantity of fat that is liquid or brought to become liquid. This insufficient quantity of fat increases more rapidly in temperature and bowl 4 equally increases in temperature. Bowl 4 is heated more rapidly than in the case of normal operation and the wall of bowl 4 opposite support 14 heats this latter, which permits triggering of limit switch 8.

In the case of a failure of heat adjusting means 6, limit switch 8 equally permits limiting the temperature of the product.

The invention is not strictly limited to the example of the embodiment described previously, but encompasses numerous modifications or improvements.

Particularly, other types of heating can be envisioned, such as for example infrared radiation heating, or heating utilizing a sheathed heating element on which the bowl is capable of resting.

The invention concerns equally electric cooking appliances with a removable bowl, such as multicookers, comprising heating means with a power greater than or equal to 1300W. Such appliances are provided to perform frying or braising, browning, grilling.

POSSIBILITIES OF INDUSTRIAL APPLICATION

The invention finds its application in the technical field of appliances for heating or for cooking foods in particular for carrying out frying in an oil bath.

What is claimed is:

1. Electric cooking appliance, comprising a body (1) forming a housing (3) provided to receive a removable bowl (4), heating means (5) in thermal communication with the bowl (4) when this latter is disposed in the housing (3), heat adjusting means (6), ultimate safety means (7) provided to compensate failure of the heat adjusting means (6), characterized in that it comprises a thermal limit switch (8) mounted on a support (14) disposed in the body (1), said limit switch being capable of being actuated before the ultimate safety means (7) when the bowl (4) is not disposed in the housing (3).

2. Appliance according to claim 1, characterized in that the body (1) comprises a counter-bowl (2) forming the support (14), the interior face of the counter-bowl (2) delimiting the housing (3).

3. Appliance according to claim 2, characterized in that the exterior face of the counter-bowl (2) forms the support (14).

4. Appliance according to claim 1, characterized in that the limit switch (8) is manually resettable.

5. Appliance according to claim 1, characterized in that the heating means (5) are disposed in the bottom of the housing (3).

6. Appliance according to claim 1, characterized in that the bowl (4) placed in the housing (3) is interposed between the heating means (5) and the support (14) on which the limit switch (8) is mounted.

7. Appliance according to claim 1, characterized in that the bowl (4) presents at least one oil level mark (15, 16) and that the limit switch (8) is mounted substantially opposite at least one of the oil level marks (15, 16) of the bowl (4) disposed in the housing (3).

8. Appliance according to claim 7, characterized in that the bowl (4) presents a maximum oil level mark (15) and a minimum oil level mark (16).

9. Appliance according to claim 8, characterized in that the limit switch (8) is mounted opposite the minimum oil level mark (16) and below the maximum oil level mark (15) of the bowl (4) disposed in the housing (3).

10. Appliance according to claim 1, characterized in that the heating means (5) are formed by a metal heating block (10) in which is embedded at least one sheathed heating element (11) associated with its own adjustment means (12) provided to limit the temperature of said heating block, said heating block being mounted on the counter-bowl (2) and being provided to support the bowl (4).

11. Appliance according to claim 1, characterized in that the limit switch (8) is capable of being triggered before the ultimate security means (7) when the bowl (4) does not contain fat.

12. Appliance according to claim 1, characterized in that the limit switch (8) is capable of being triggered before the ultimate safety means (7) when the bowl (4) contains an insufficient quantity of fat.

13. Appliance according to claim 1, characterized in that it is a fryer.

14. Appliance according to claim 1, characterized in that the heating means (5) have a power greater than 1300 W.

* * * * *